United States Patent
Wakeman

Patent Number: 5,307,997
Date of Patent: May 3, 1994

[54] FUEL INJECTOR SWIRL PASSAGES

[75] Inventor: Russell J. Wakeman, Newport News, Va.

[73] Assignee: Siemens Automotive L.P., Auburn Hills, Mich.

[21] Appl. No.: 30,529

[22] Filed: Mar. 12, 1993

[51] Int. Cl.⁵ .................................... F02M 61/12
[52] U.S. Cl. .......................... 239/491; 239/585.3
[58] Field of Search ............... 239/487, 488, 491, 494, 239/497, 585.3-585.5, 533.12, 533.11

[56] References Cited

U.S. PATENT DOCUMENTS

| | | | |
|---|---|---|---|
| 1,216,630 | 2/1917 | Tuthill | 239/494 |
| 4,805,837 | 2/1989 | Brooks et al. | 239/125 |
| 4,887,769 | 12/1989 | Okamoto et al. | 239/493 |
| 4,971,254 | 11/1990 | Daly et al. | 239/585.1 |
| 5,012,981 | 5/1991 | Holzgrefe et al. | 239/487 |
| 5,033,716 | 7/1991 | Mesenich | 251/129.21 |
| 5,044,561 | 9/1991 | Holzgrefe | 239/487 |
| 5,114,077 | 5/1992 | Cerny | 239/483 |
| 5,170,945 | 12/1992 | Daly et al. | 239/585.4 |

*Primary Examiner*—Andres Kashnikow
*Assistant Examiner*—Karen B. Merritt
*Attorney, Agent, or Firm*—George L. Boller; Russel C. Wells

[57] ABSTRACT

Each swirl passages of the needle guide and fuel swirl member of a fuel injector has a longer and wider entrance portion and a shorter and narrower exit portion to allow only the latter portion, not the former portion, to perform a metering function. Production of swirl passages is facilitated and more consistent metering results.

9 Claims, 3 Drawing Sheets

FUEL INJECTOR SWIRL PASSAGES

FIELD OF THE INVENTION

This invention relates to fuel injectors for internal combustion engines, especially direct injection gasoline injectors.

BACKGROUND AND SUMMARY OF THE INVENTION

From issued patents such as commonly assigned U.S. Pat. Nos. 4,805,837 and 5,170,945, it is known to provide swirl passages in a needle guide and fuel swirl member that is located immediately above the valve seat. These passages are typically drilled holes that are skewed to the axis of the fuel injector and arranged circumferentially around the valve needle. Fuel passing through the swirl passages exits with outward velocity and solid-body swirl. The two components of velocity create a hollow cone with high shear and Raleigh instabilities that tear the fluid sheets into small particles. The drilled swirl holes are usually of a very high L/D (length to diameter) ratio in order to assure that the fluid is directed correctly and is of sufficiently high velocity to impart the desired swirling motion.

In a high-pressure injector that is used to directly inject gasoline into an engine cylinder, such swirl passages pose several problems. The first involves manufacturing in a mass-production setting. The twist drills required for drilling the long slender passages are relatively fragile because they too must be long and slender, and the drilling itself is conducted at a compound angle to the injector axis. These factors tend to make the process difficult, time-consuming, and expensive.

A lack of precision of such drillings may also adversely affect the fuel flow. For example, if a drilled hole is used as a metering orifice to control flow rate, it will be sensitive to surface finish, drilling length, drilling diameter, entrance and exit conditions, burrs, and fluid viscosity. Inability to consistently secure full process control over the drillings during production is apt to lead to inconsistent metering performance in finished injectors.

Another concern in such a fuel injector is the effect of deposits that may build up on the wall of a swirl passage. Since a swirl passage is small and the drilled surface area is large in comparison to the flow area through the swirl passage, the flow rate will be sensitive to accumulation of deposits on the swirl passage wall. While all gasoline fuel injectors are subject to some extent to accumulations of varnish due to the composition of typical gasolines, a direct gasoline injector is apt to be more sensitive than say a port injector because its nozzle is exposed to the combustion chamber and hence to higher temperatures that encourage varnish formation.

One more concern is the strong dependence of flow rate on the viscosity of fluid. A long slender drilling is quite sensitive to viscosity which is in turn highly temperature sensitive. In an application where a flow orifice may experience temperatures anywhere from about −40 degrees C. to over 500 degrees C., temperature sensitivity becomes an important issue for associated calibration hardware and software.

The present invention proposes to make the swirl passage in stepped fashion, with a larger portion at the entrance and a very short portion of appropriate metering diameter at the point of discharge to the swirl space. Although U.S. Pat. No. 4,805,837 shows a stepped construction, such stepped construction comprises a long narrow portion at the entrance and a short wider portion at the exit.

A construction for a swirl passage in accordance with the present invention reduces the dependence of flow on the quality of the whole swirl passage since the larger drilling at the entrance will not be the restricting part of the swirl passage. The resulting implication is that less precision, and hence less expense, will be associated with the larger entrance portion. For example, the larger portion of the swirl passage can be made by a less costly process such as coring a metal injection molded part, a high-speed drilling process, or EDM. The shorter, smaller portion that performs the metering can then be created more quickly and easily (since far less material is being removed) with more accurate processes such as laser machining, precision drilling, or even punching. The resulting short metering portion has several advantages. It is well known that short sharp edged orifices are relatively insensitive to viscosity variations, eliminating the temperature calibration shifts that may plague long drilling. Since the long section no longer performs a metering function, accumulation of deposits on its wall no longer significantly affects the flow rate through the swirl passage. The shorter portion is, or is equivalent to, a sharp-edged orifice, providing minimal surface area for deposit build-up. Experience with port injectors indicates a self-cleaning effect for such an orifice because any deposit build-up on it will be inherently weak, and while still small, will break off, to be carried away by entrainment with the passing flow. This self-cleaning effect makes calibration much more stable over the life of the fuel injector. Flow variation due to production tolerances is also less because there is less area over which variations can affect flow.

One more advantage is that calibration may be varied to a certain extent during the course of the mass-production process. With a stepped swirl passage according to the present invention, the relative lengths of the two different-sized portions of the swirl passage may be varied to vary the flow to some extent. For example, the depth of the larger portion may be changed before the smaller hole is created without interrupting the manufacturing process in order to change the size of a twist drill, as would be necessary with a non-stepped swirl passage. Such drilled non-stepped swirl passages can be changed only by changing the twist drill used to machine them. Since such twist drills are typically available only in finite increments of diameter, it is unlikely that the process using them can be trimmed as well as with the disclosed stepped construction process.

The foregoing features, advantages, and benefits of the invention, along with additional ones, will be seen in the ensuing description and claims which should be considered in conjunction with the accompanying drawings. The drawings disclose a presently preferred embodiment of the invention according to the best mode contemplated at this time for carrying out the invention.

DESCRIPTION OF THE PREFERRED EMBODIMENT

Figure 1:
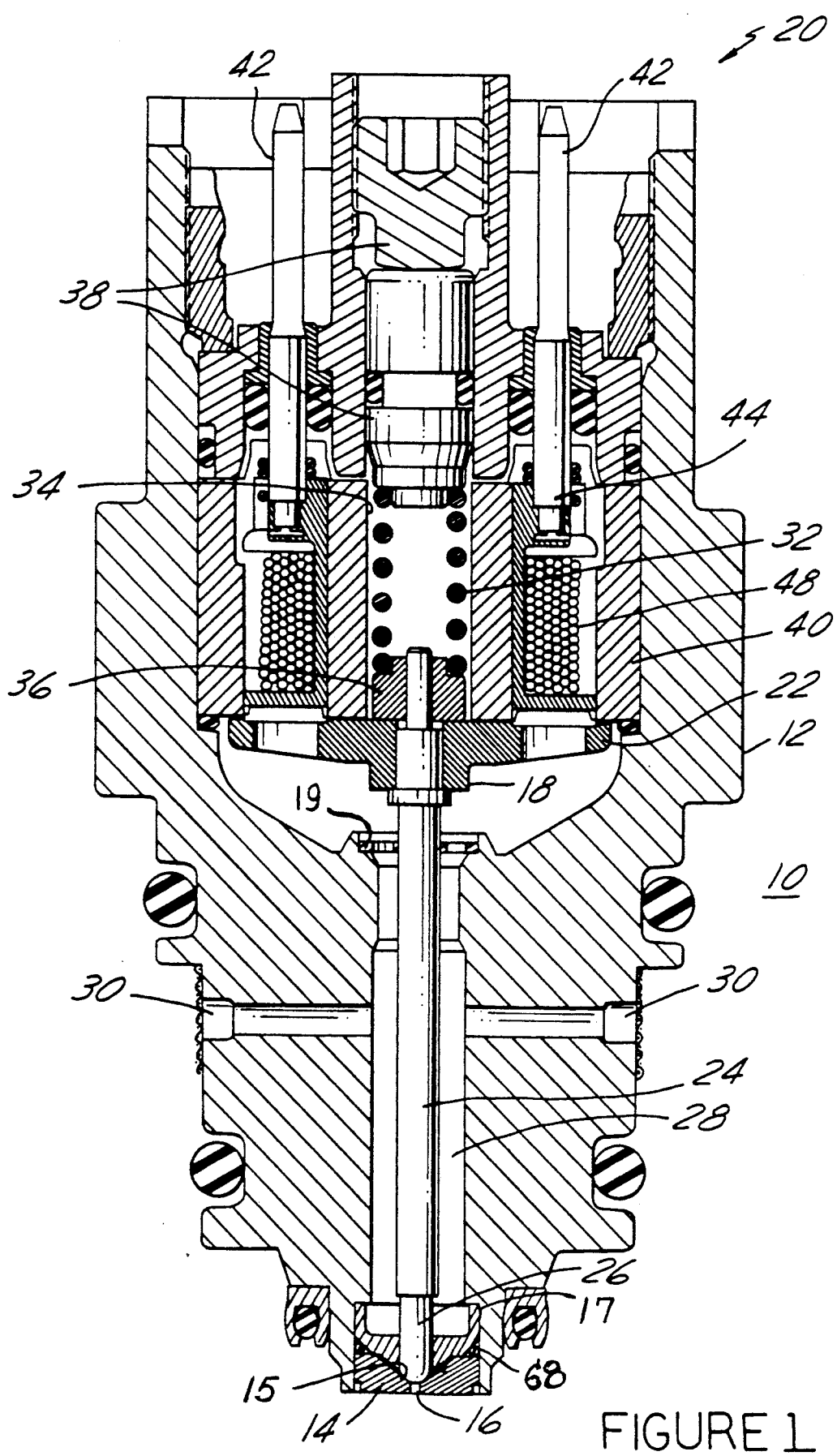
FIG. 1 is a longitudinal cross-sectional view through a representative fuel injector embodying principles of the present invention.
Figure 2:
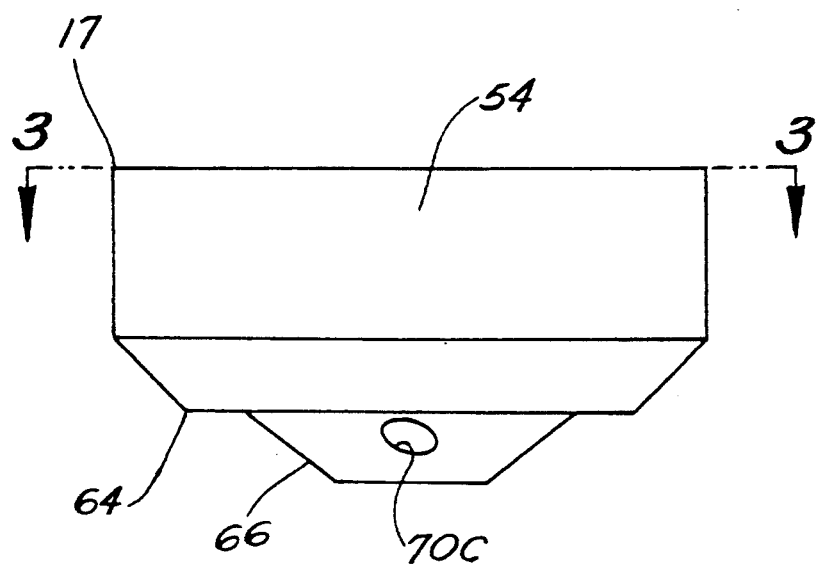
FIG. 2 is an enlarged elevational view of one of the members of the fuel injector of FIG. 1 by itself.
Figure 3:
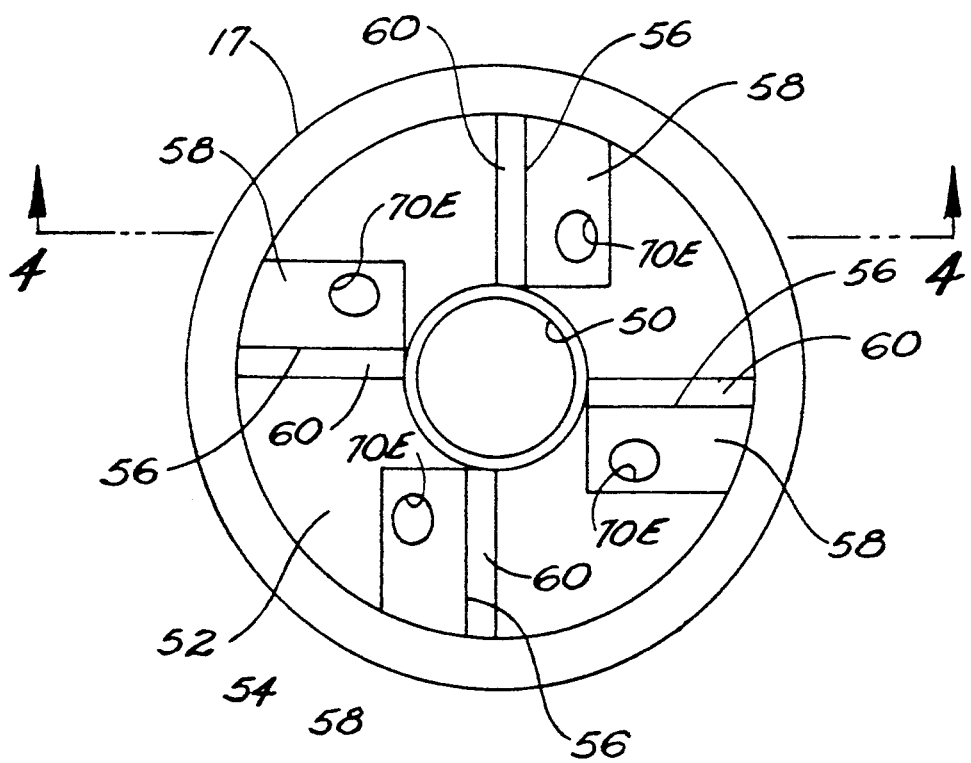
FIG. 3 is a top plan view of the member of FIG. 2 as taken along line 3—3 in FIG. 2.
Figure 4:
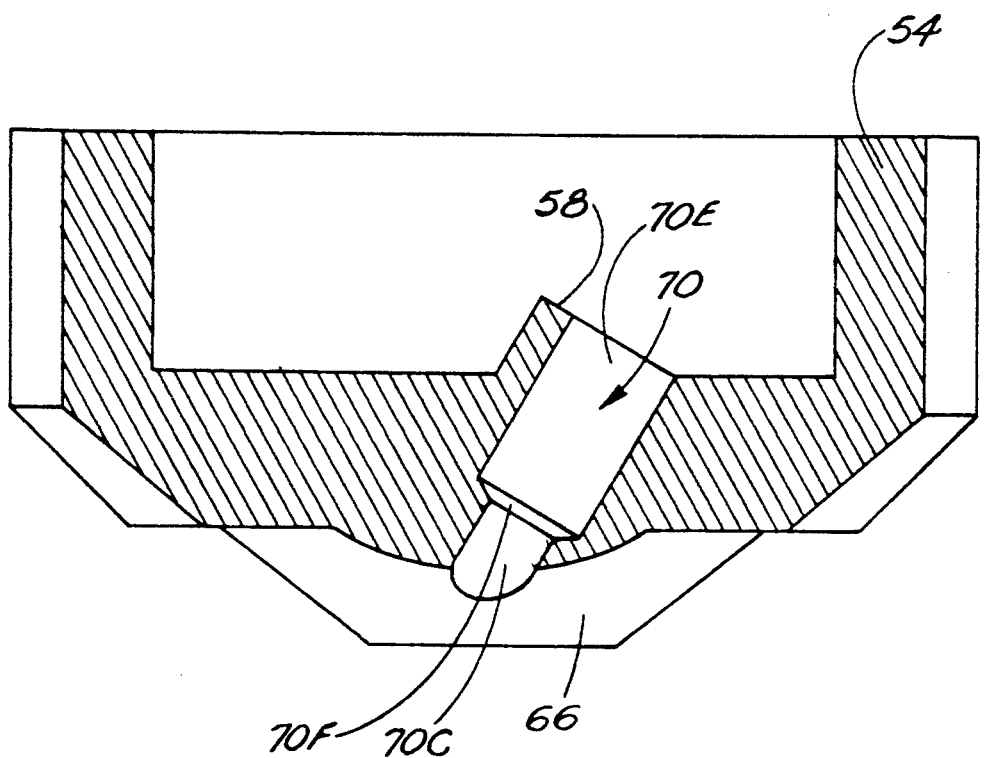
FIG. 4 is an enlarged cross-sectional view as taken along line 4—4 in FIG. 3.
Figure 5:
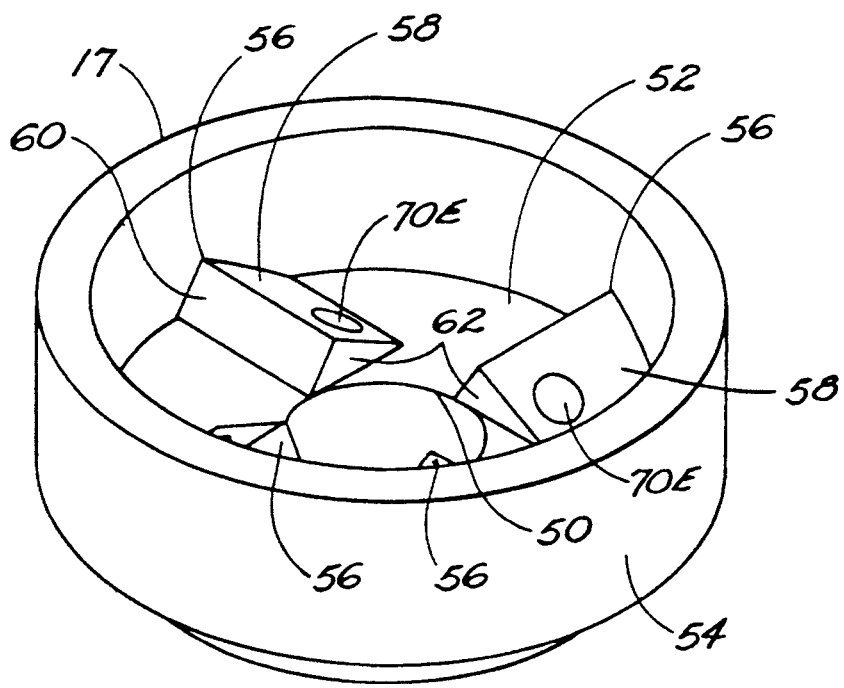
FIG. 5 is a perspective view of the member of FIG. 2.

FIG. 1 shows a representative fuel injector 10 embodying principles of the invention. The fuel injector comprises a housing 12 having at its nozzle end a valve seat member 14 comprising a valve seat 15 that circumscribes an outlet 16. Within housing 12 just inside valve seat member 14 is a needle guide and fuel swirl member 17. In cooperation with an upper guide member 19, member 17 serves to guide the axial reciprocal motion of a needle valve 24 which forms a part of an armature assembly 18. At its upper end as shown in FIG. 1, armature assembly 18 comprises a disk 22 that is centrally affixed to needle valve 24 and confronts an electrically operated solenoid 20. At its opposite end needle valve 24 comprises a rounded tip end 26 that is shown seated on valve seat 15 closing outlet 16. The needle valve is biased to this position by a spring 32 that is disposed in a bore 34 between a spacer block 36 on disk 22 and a tension adjustment mechanism 38 that adjusts the spring bias force. Solenoid 20 includes a stator 40, electric terminals 42 adapted for connection to a control circuit (not shown) and passing through apertures 44 in an axial end wall of stator 40, and a coil 48 whose ends are connected to terminals 42. When coil 48 is energized by electric current via terminals 42, a magnetic field is generated within a magnetic circuit comprising stator 40, disk 22, and an intervening working gap to overcome the spring bias and displace armature assembly 18 toward solenoid 20, thereby unseating tip 26 from seat 15 and allowing fuel to pass through outlet 16. Pressurized fuel is introduced into the interior of the fuel injector via one or more fuel inlet ports 30 leading to a central axial passage 28 of housing 12. This much of the description of FIG. 1 can be found in the inventor's commonly assigned U.S. Pat. No. 5,207,410.

The invention of the present patent application concerns details of member 17 which are disclosed in FIGS. 2-5. Member 17 comprises a generally circular shape having a central circular guide hole 50 through which the tip end of the needle valve passes. Guide hole 50 is located in a transverse wall 52. A sidewall 54 extends axially from the outer perimeter of transverse wall 52. The upstream facing surface of transverse wall 52 is nominally perpendicular to needle valve 24, but it contains four upstanding formations 56 that are symmetrically arranged at ninety degree intervals. Each formation 56 comprises two side faces 58, 60, and an end face 62. Opposite end face 62, each formation 56 merges into sidewall 54. Each formation 56 is circumferentially spaced apart from its immediately adjacent ones. The downstream facing surface of transverse wall 52 comprises an outer shoulder 64 via which member 17 is located on member 14, and a central frusto-conical surface 66 that cooperates with seat surface 15 to form a swirl space, or swirl zone, when the two members 14, 17 are in assembly on housing 12, as in FIG. 1. The parts are shaped to provide space for a seal 68 to prevent fuel leakage from the injector nozzle end between housing 12 and members 15, 17.

A corresponding fuel swirl passage 70 extends between each face 58 and surface 66. Each passage 70 is skewed relative to the fuel injector's axis, and consists of two straight coaxial portions: an entrance portion 70E and a calibrated portion 70C. Entrance portion 70E has a circular transverse cross section as viewed axially of passage 70. So does calibrated portion 70C. The axis of each passage 70 is perpendicular to its corresponding surface 58. Entrance portion 70E has both a larger transverse cross section and a longer length than calibrated portion 70C. If the length and diameter of calibrated portion 70C are suitably dimensioned in accordance with known formulae, it will function as a sharp edged metering orifice. A frusto-conical surface 70F merges portion 70E into portion 70C.

While a presently preferred embodiment of the invention has been illustrated and described, it should be appreciated that principles are applicable to other embodiments that fall within the scope of the following claims.

What is claimed is:

1. A fuel injector comprising a valve body having a main longitudinal axis and comprising an inlet via which pressurized liquid fuel is introduced into said valve body, a valve seat member comprising a frusto-conical surface containing a valve seat and circumscribing a fuel outlet, a fuel path extending through said valve body between said inlet and said outlet, a needle guide and fuel swirl member disposed within said valve body and comprising an axially upstream face that is toward said inlet and an axially downstream face that is toward said outlet, said needle guide and fuel swirl member's axially downstream face cooperating with said valve seat member to define a swirl chamber space, an electrically operated mechanism disposed on said valve body and comprising an axially reciprocal armature means and bias means for axially reciprocating over a given stroke a needle valve member that passes through a guide hole in said needle guide and fuel swirl member and has a tip end confronting said seat member such that said tip end is seated on and unseated from said valve seat to close and open said fuel path, said needle guide and fuel swirl member comprising plural swirl passages extending through said needle guide and fuel swirl member between said axially upstream and downstream faces thereof in directions that are skew to said axis and opening at said downstream face of said needle guide and fuel swirl member toward said frusto-conical surface in spaced upstream relation to said valve seat such that fuel exiting said swirl passages flows with a cicumferential component of motion about said axis as it passes through said swirl chamber toward said outlet, characterized in that each of said swirl passages is straight, comprising a calibrated portion of given transverse cross-sectional area that is downstream of an entrance portion, said entrance portion has a transverse cross-sectional area that is greater throughout than said given transverse cross-sectional area, wall surfaces of both said calibrated and entrance portions are surface portions of said needle guide and fuel swirl member, in each swirl passage the transverse cross-sectional area of said calibrated portion is circular throughout, the transverse cross-sectional area of aid entrance portion is circular throughout, and said calibrated and entrance positions are co-axial and characterized further that in each swirl passage said entrance portion begins at a corresponding flat surface portion of said upstream face of said needle guide and fuel swirl member that is perpendicular to said entrance and calibrated portions thereof.

2. A fuel injector as set forth in claim 1 characterized further in that in each said swirl passage, a frusto-conical shoulder joins said entrance portion with said calibrated portion.

3. A fuel injector as set forth in claim 1 characterized further in that in each swirl passage said entrance portion is longer than said calibrated portion.

4. A fuel injector as set forth in claim 1 characterized further in that each said corresponding flat surface portion is in a corresponding raised portion of said upstream face of said needle guide and fuel swirl member.

5. A fuel injector comprising a valve body having a main longitudinal axis and comprising an inlet via which pressurized liquid fuel is introduced into said valve body, a valve seat member comprising a frusto-conical surface containing a valve seat and circumscribing a fuel outlet, a fuel path extending through said valve body between said inlet and said outlet, a needle guide and fuel swirl member disposed within said valve body and comprising an axially upstream face that is toward said inlet and an axially downstream face that is toward said outlet, said needle guide and fuel swirl member's axially downstream face cooperating with said valve seat member to define a swirl chamber space, an electrically operated mechanism disposed on said valve body and comprising an axially reciprocal armature means and bias means for axially reciprocating over a given stroke a needle valve member that passes through a guide hole in said needle guide and fuel swirl member and has a tip end confronting said seat member such that said tip end is seated on and unseated from said valve seat to close and open said fuel path, said needle guide and fuel swirl member comprising plural swirl passages extending through said needle guide and fuel swirl member between said axially upstream and downstream faces thereof in directions that are skew to said axis and opening at said downstream face of said needle guide and fuel swirl member toward said frusto-conical surface in spaced upstream relation to said valve seat such that fuel exiting said swirl passages flows with a cicumferential component of motion about said axis as it passes through said swirl chamber toward said outlet, characterized in that in each of said swirl passages a calibrated portion of given transverse cross-sectional area is downstream of an entrance portion which has transverse cross-sectional area that is greater throughout than said given transverse cross-sectional area, and in that each swirl passage begins at a corresponding flat surface portion of said upstream face of said needle guide and fuel swirl member that is perpendicular to fuel flow entering said entrance portion thereof, and characterized further in that the entirety of each said corresponding flat surface portion is in a corresponding raised portion of said upstream face of said needle guide and fuel swirl member.

6. A fuel injector as set forth in claim 5 characterized further in that in each swirl passage the transverse cross-sectional area of each calibrated portion is circular throughout, the transverse cross-sectional area of each entrance portion is circular throughout, and said calibrated portion is co-axial with said entrance portion.

7. A fuel injector as set forth in claim 6 characterized further in that in each said swirl passage, a frusto-conical shoulder joins said entrance portion with said calibrated portion.

8. A fuel injector as set forth in claim 6 characterized further in that in each swirl passage, said entrance portion is longer than said calibrated portion.

9. A fuel injector as set forth in claim 5 characterized further in that in each swirl passage said entrance and calibrated portions are straight and coaxial.

* * * * *